United States Patent [19]
McKittrick

[11] Patent Number: 5,937,627
[45] Date of Patent: Aug. 17, 1999

[54] GARDENING IMPLEMENT HAVING ENHANCED LEVERAGE

[75] Inventor: Janie McKittrick, 4901 Frontenac Ave., Golden Valley, Minn. 55422

[73] Assignee: Janie McKittrick, Golden Valley, Minn.

[21] Appl. No.: 08/693,345

[22] Filed: Aug. 6, 1996

Related U.S. Application Data

[63] Continuation-in-part of application No. 08/614,158, Mar. 8, 1996, Pat. No. 5,813,206.

[51] Int. Cl.⁶ .................................................. A01D 7/00
[52] U.S. Cl. ................................... 56/400.01; 56/400.04; 172/378; 294/58
[58] Field of Search ........................... 56/400.01, 400.04, 56/400.05, 400.17; 172/378; 294/58

[56] References Cited

U.S. PATENT DOCUMENTS

| | | | |
|---|---|---|---|
| 309,437 | 12/1884 | Calef | 294/58 X |
| 712,843 | 11/1902 | Paul | 294/58 X |
| 2,180,544 | 1/1939 | Nissen | 56/400.01 X |
| 2,710,571 | 6/1955 | Pfister. | |
| 3,232,355 | 2/1966 | Woolworth. | |
| 4,477,114 | 10/1984 | Callis | 294/58 X |
| 4,644,740 | 2/1987 | Lee. | |
| 4,822,087 | 4/1989 | DeCario. | |
| 4,888,846 | 12/1989 | Natale. | |
| 5,014,792 | 5/1991 | Gierloff. | |
| 5,177,941 | 1/1993 | Tharp et al.. | |

FOREIGN PATENT DOCUMENTS

| | | | |
|---|---|---|---|
| 2183433 | 6/1987 | United Kingdom | 294/58 |
| 2248034 | 3/1992 | United Kingdom | 294/58 |

*Primary Examiner*—Heather Shackelford
*Attorney, Agent, or Firm*—Dorsey & Whitney LLP

[57] ABSTRACT

A hand held garden tool configured to enhance downward force for digging and raking. The tool has a rod frame which extends from a working element attached to the tool at the front end of the tool to a brace located at the rear of the tool. The brace rests on the user's wrist or forearm, so that additional force is developed when the working element is urged downwardly into the ground. A handle depends from the frame at a point between the working element and the brace. Vertical orientation of the handle is more natural and comfortable than would be a horizontal orientation. The handle is provided with a molded grip for cooperating with a user's hand. The tool has a chuck for accepting diverse working heads, and preferably is provided with a plurality of diverse working heads. Exemplary working heads include rake, spade, and pry.

5 Claims, 2 Drawing Sheets

GARDENING IMPLEMENT HAVING ENHANCED LEVERAGE

This application is a Continuation-In-Part of Ser. No. 08/614,158, U.S. Pat. No. 5,813,206 filed Mar. 8, 1996.

BACKGROUND OF THE INVENTION

1. Field of the Invention

The present invention relates generally to manual garden tools for digging and earth working. More particularly, the invention relates to a garden tool having removable a working element, that being understood to encompass blade, tines, or other component contacting the soil for digging, prying, and other working of the earth. The novel tool comprises a handle disposed downwardly from the longitudinal dimension of the tool and oriented downwardly, and an arm brace for engaging the forearm. The arm brace enhances leverage or force which may be applied to push the tines or other working elements downwardly into the soil.

The tool also has a chuck for manual attachment of diverse working elements. Illustratively, the tool may serve as a rake if a tined working element is attached, or as a spade if a shovel is attached. It is contemplated that different working elements will be included for digging, prying, raking, and similar working of earth and plants.

2. Description of the Prior Art

Garden rakes, particularly small rakes held in one hand, are employed by gardeners for both raking and digging purposes. This type of tool is quite useful in clearing dead plant growth from the surface of the soil, for separating roots from soil, and for digging shallow holes and trenches for planting.

Resistance encountered while performing these tasks varies considerably, at times requiring force beyond that which may be developed while grasping the handle of the tool. The prior art has suggested numerous arm braces which may be exploited for enhancing force applied to the blade, tines, or other working element of the tool.

U.S. Pat. No. 2,710,571, issued to Frederick W. Pfister on Jun. 14, 1955 illustrates a tined garden rake having a handle and an arm brace. Unlike the tool of Pfister, the handle of the present invention is vertically oriented when the tines face the ground. This orientation of the handle affords grip which is slightly more natural, comfortable, and therefore fatigue resistant than the horizontal orientation of Pfister's handle. Greater force can be developed and applied by a user in the present invention than occurs with Pfister's arrangement. Also, the present invention has removabe working elements, and can therefore adapt for new tasks.

U.S. Pat. No. 712,843, issued to Ralph H. Paul on Nov. 4, 1902 describes an arm brace in combination with a vertical handle. However, the working element of the tool is aligned with the longitudinal dimension of the tool. This orientation is suitable for forward movement of the tool. However, unlike the present invention, this arrangement does not enable downward force to be applied to the working element when the longitudinal dimension of the tool is horizontal, or parallel to the ground. Also, the brace requires fastening of a strap for effectiveness. By contrast, in the instant invention, the working element is perpendicular to the longitudinal dimension. Paul's device has a scraping blade, which is unlike the tines of the present invention in structure and purpose. Paul's device lacks ability to change working elements.

A similar device is shown in U.S. Pat. No. 4,888,846, issued to Thomas Natale on Dec. 26, 1989. Natale has a working element disposed in alignment with the longitudinal dimension of his tool. Unlike the present invention, this arrangement does not enable downward force to be applied to the working element when the longitudinal dimension of the tool is horizontal, or parallel to the ground. Natale's device has a scraping blade, which is unlike the tines of the present invention in structure and purpose. Natale lacks ability to change working elements.

U.S. Pat. No. 4,822,087, issued to Tony J. DeCarlo on Apr. 18, 1989, features a tool having a vertical handle and an arm brace. However, the arm brace is disposed to be ineffective if DeCarlo's tool were forced into the ground at its working element. This arrangement is opposite that of the present invention. Also, DeCarlo's working element is flaccid, unlike that of the present invention. Therefore, the purpose of the present invention cannot be realized by DeCarlo's invention. DeCarlo's working element has no relation to piercing the ground or to raking action, unlike the present invention. DeCarlo's device is not able to change working elements, unlike the present invention.

None of the above inventions and patents, taken either singly or in combination, is seen to describe the instant invention as claimed.

SUMMARY OF THE INVENTION

The present invention provides an inexpensively fabricated tool well suited for development and application of downward force for a rake, scoop, pry, or hand shovel. In an advancement over the prior art, the handle is advantageously oriented for development and application of downward force by one hand and arm. The handle is turned vertically downwardly with respect to the longitudinal dimension of the tool. This results in a more natural and comfortable position of the hand, wrist, and arm. More force is developed, and can be maintained for longer periods of time.

The working element, which is preferably a garden tool such as a rake having tines, a spade, or a prying tool for removing roots from the ground, is replaceable. A chuck located at the front of the tool accepts different working heads, each having a different type of working element. Thus, different tasks may be performed by one tool by modifying the tool to the particular task at hand. The chuck is of the rotatable type, and may be operated by hand. Therefore, in addition to versatility of the diverse choices of working elements, the working elements may be exchanged manually.

The tool is formed primarily from rod stock. A longitudinal base member supports the chuck at the front, the handle at its midpoint, and a generally U-shaped frame at the rear for receiving a strap. The strap cushions contact of the user's wrist and adapts the wrist to the tool for bearing downwardly. The handle depends from the base member.

Accordingly, it is a principal object of the invention to provide a hand held gardening tool having a handle and a working element for piercing the ground, and enhancing downward force developed and applied by the user.

It is another object of the invention to orient the handle vertically, for more natural and comfortable grasp of the handle when the user's arm is near and parallel to the ground.

It is a further object of the invention to enable replacement of the working head of the tool.

Still another object of the invention is to provide diverse working heads, so that diverse tasks may be performed with one tool.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Various other objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENTS

Figure 1:
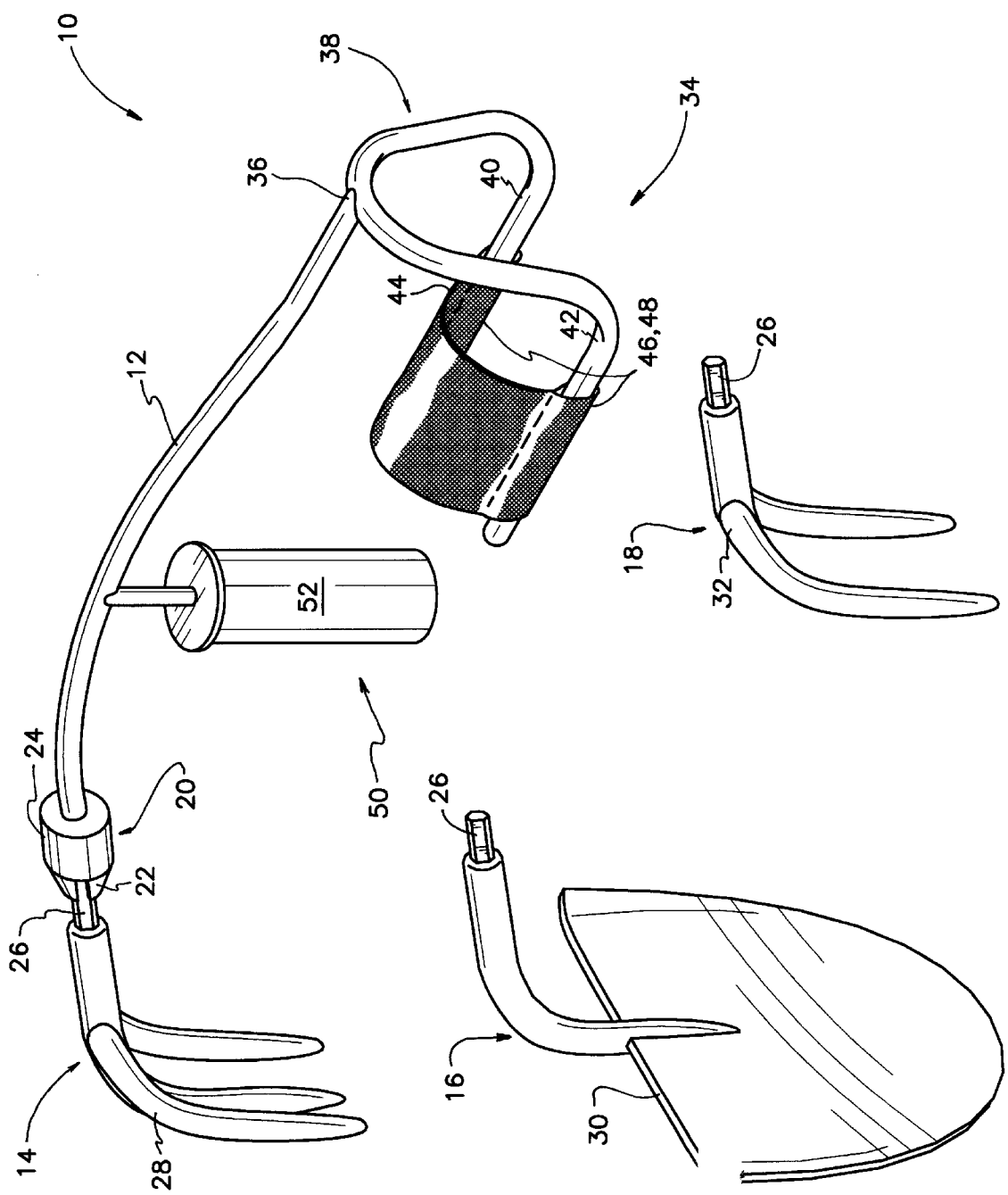
FIG. 1 is a perspective, exploded view of the invention.

FIG. 1 shows the novel gardening implement 10 as comprising a longitudinally oriented frame member 12 and a plurality of working heads 14,16,18. A chuck 20 is solidly fixed to frame member 12 at the proximal end 22 of frame member 12, as shown toward the left of FIG. 1, for selectively receiving any one working head 14, 16, or 18. Chuck 20 is of conventional construction, having jaws 22 which constrict when collar 24 is tightened. Chuck 20 is tightened and loosened in conventional manner by rotating collar 24 in opposite directions when the shank of any working head 14, 16, or 18 is received in the jaws of chuck 20.

Each working head 14, 16, or 18 has a shank 26 compatible with chuck 20 and a working element 28, 30, or 32 which differs from the other working elements, so that implement 10 may be adapted to serve diverse purposes. In the embodiment depicted, working elements 28, 30, and 32 are, respectively, a rake having a plurality of tines, a spade, and a pry. Working elements 28, 30, and 32 project downwardly and vertically from frame member 12, so that implement 10 maintains overall configuration and method of use regardless of which working head 14, 16, or 18 is installed therein.

A brace 34 is attached to the distal end 36 of frame member 12. Brace 34 provides a convenient surface for contact with the user's arm (see FIG. 2) above the wrist when implement 10 is in use. Brace 34 preferably comprises a U-shaped frame 38 having two horizontally oriented extension members 40, 42. A strap 44 having two loops 46, 48 formed at its respective ends may be slipped over brace members 40, 42 in order to engage frame member 12. Loops 46, 48 are formed in any suitable way, such as by stitching 49 as depicted in the embodiment of FIG. 1. Strap 44 distributes force developed by the user evenly over the user's wrist or forearm (see FIG. 2).

A handle 50 is attached to and depends vertically from frame member 12 at a point intermediate chuck 20 and brace 34. Preferably, handle 50 has a molded grip 52 for conforming to the configuration of the human hand. Grip 52 may be formed from a resilient material such as a synthetic resin foam for conformity with the user's hand, rather than having a molded conforming configuration.

Figure 2:
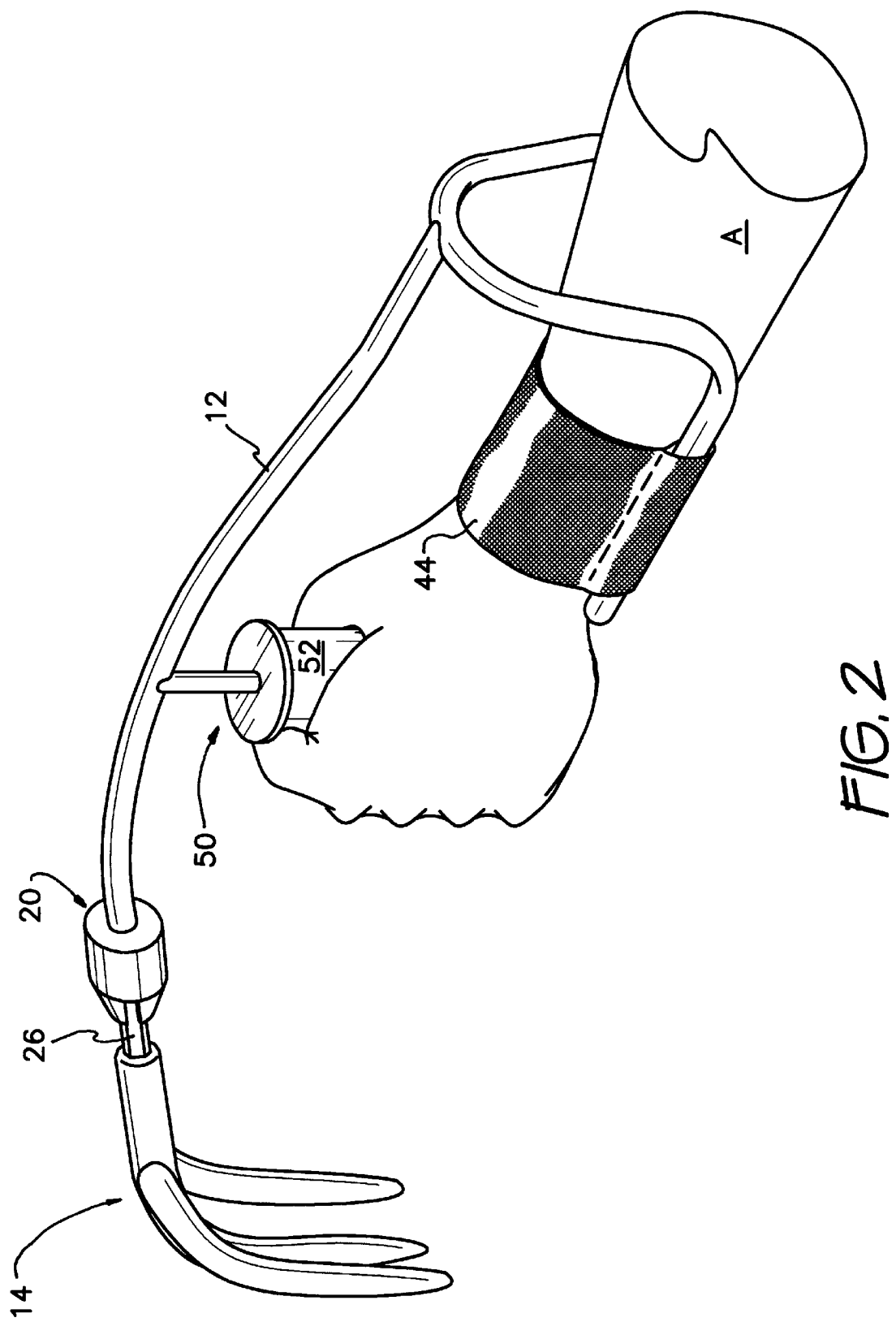
FIG. 2 is an environmental, perspective view of the invention, illustrating only one of the several possible working heads installed in the gardening implement.

Turning now to FIG. 2, novel gardening implement 10 is shown being grasped by a user. Brace members 40, 42 are disposed below and parallel to frame member 12, so that handle 50 may be grasped in pistol grip fashion, thereby providing a comfortable and effective grasping position. Strap 44 has a length sufficient to enable it to bow above the user's arm A when gardening implement 10 is being used.

Frame member 12 is gently curved to conform to the general configuration of a person's arm when the hand is clenched, as will usually be required to grasp handle 50.

The improved garden implement 10 is employed by grasping in the manner illustrated in FIG. 2. With the forearm A of the user passing beneath strap 44, the user's hand grasps handle 14 with fingers encircling grip 52. The user then exerts downward force at handle 50 while either maintaining forearm A at a constant position above the ground or applying upward force at brace 16. Force developed by this manner of operation assists in urging the attached working head into the ground.

It will be appreciated that in use, gardening implement 10 functions as a lever. With downward force applied by the user's hand to handle 50 and upward force provided at working head 14, strap 44 serves in the capacity of a fulcrum. Flexibility and surface area of strap 44 cushions the user's arm A against reactive torque or force developed by implement 10 when digging, raking, or prying.

It is contemplated that an advantageous method of fabrication is achieved by bending rod stock to form frame member 12. Rod stock is a homogeneous, unitary member which may be subjected to bending to achieve a required shape, and which is readily welded. Chuck 20, frame 38 (see FIG. 1), and handle 50 may be securely and permanently attached to frame member 12 by welding.

It will occur to those of skill in the art that variations and modifications may be introduced to the design of gardening implement 10. For example, working heads other than those depicted may be selected. Chuck 20 may be mounted on a working head rather than on frame member 12. Chuck 20 may comprise an expanding member for engaging a working head, rather than having constricting jaws 22 as described. Working heads may have members other than shank 26 for engaging chuck 20. Strap 44 may attach to gardening implement 10 in ways other than that described.

Also, overall configuration may be modified as desired. It would be feasible to maintain frame member 12 straight rather than curved, having frame 38 extend further to accommodate this modification. Also, orientation of frame 38 may be reversed relative to frame member 12. If frame 38 is reversed, strap 44 will be slipped over brace members 40, 42 from the rear of implement 10. Also, frame member 12 may be shortened.

It is to be understood that the present invention is not limited to the embodiments described above, but encompasses any and all embodiments within the scope of the following claims.

I claim:

1. A hand held gardening implement to be operated with a hand and associated forearm of a user comprising:

a frame member having a longitudinal dimension, a proximal end, and a distal end;

a working element removably attached to said frame member adjacent said proximal end of said frame member, said working element projecting substantially perpendicular to said frame member;

a brace attached to said frame member adjacent said distal end of said frame member, wherein said brace has a U-shaped portion having legs extending substantially perpendicular to said frame member and substantially parallel to said working element, said brace also having an extension member integrally extending from each leg parallel to said frame member;

a strap having loops slipped over each extension member adapted to engage the forearm when in use;

and a handle attached to said frame member intermediate said working element and said brace, said handle projecting substantially perpendicular to said frame and substantially parallel with said work element for being grasped by the user's hand.

2. The gardening implement according to claim 1, said working element including a plurality of tines, whereby said gardening implement is a rake.

3. The gardening implement according to claim 1, said handle further comprising a grip having means for conforming to the configuration of the human hand.

4. The gardening implement according to claim 1, further comprising a chuck solidly fixed to said frame member at said proximal end of said frame member.

5. The gardening implement according to claim 4 adapted to receive one of a plurality of different working heads.

* * * * *